US006670996B2

United States Patent
Jiang

(10) Patent No.: US 6,670,996 B2
(45) Date of Patent: Dec. 30, 2003

(54) APPARATUS AND METHOD FOR DISPLAY OF PROGRESSIVE AND INTERLAND VIDEO CONTENT

(75) Inventor: Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/377,235

(22) Filed: Aug. 19, 1999

(65) Prior Publication Data
US 2002/0130970 A1 Sep. 19, 2002

Related U.S. Application Data
(60) Provisional application No. 60/097,236, filed on Aug. 20, 1998.

(51) Int. Cl.[7] .............................. H04N 5/46; H04N 5/91
(52) U.S. Cl. ........................ 348/558; 348/554; 386/131
(58) Field of Search ................................ 348/554, 555, 348/556, 558, 469, 441, 446, 443, 423.1; 386/131; 375/240.1, 240.12

(56) References Cited

U.S. PATENT DOCUMENTS

| | | | | |
|---|---|---|---|---|
| 5,594,552 A | * | 1/1997 | Fujinami et al. | 386/131 |
| 5,646,693 A | * | 7/1997 | Cismas | 348/441 |
| 5,771,357 A | * | 6/1998 | Kato et al. | 395/200.77 |
| 5,835,672 A | * | 11/1998 | Yagasaki et al. | 386/111 |
| 5,847,772 A | * | 12/1998 | Wells | 348/571 |
| 5,912,710 A | * | 6/1999 | Fujimoto | 348/445 |
| 6,072,548 A | * | 6/2000 | Schoner et al. | 375/240.28 |
| 6,108,046 A | * | 8/2000 | Wu et al. | 348/558 |
| 6,115,499 A | * | 9/2000 | Wang et al. | 382/232 |
| 6,118,486 A | * | 9/2000 | Reitmeier | 348/441 |
| 6,118,491 A | * | 9/2000 | Wu et al. | 348/526 |
| 6,157,739 A | * | 12/2000 | Yazawa et al. | 382/233 |
| 6,167,088 A | * | 12/2000 | Sethuraman | 375/240.1 |
| 6,198,772 B1 | * | 3/2001 | Boice et al. | 375/240.17 |
| 6,233,392 B1 | * | 5/2001 | Comer | 386/68 |
| 6,236,806 B1 | * | 5/2001 | Kojima et al. | 386/131 |
| 6,289,129 B1 | * | 9/2001 | Chen et al. | 382/232 |
| 6,298,090 B1 | * | 10/2001 | Challapali et al. | 375/240.29 |
| 6,317,165 B1 | * | 11/2001 | Balram et al. | 348/699 |
| 6,356,587 B1 | * | 3/2002 | Choi | 375/240 |
| 6,441,812 B1 | * | 8/2002 | Voltz | 345/213 |

OTHER PUBLICATIONS

MPEG–2 Standard. Information Technology–Generic Coding of Moving Pictures and Associated Audio Information: Video. ISO–IEC 13818–2; May 15, 1996.

* cited by examiner

Primary Examiner—John Miller
Assistant Examiner—Annan Q. Shang
(74) Attorney, Agent, or Firm—Blakely, Sokoloff, Taylor & Zafman LLP

(57) ABSTRACT

A method and apparatus for processing video data in which a decoder receives video data and decodes the video data into fields based on content format. The decoder generates a flag associated with the content format, which is used to control how the fields are stored and retrieved from memory for display on a display device.

15 Claims, 9 Drawing Sheets

| FIELD NO. | INPUT VIDEO | R_FLAG | P_FLAG | VPORT ACTION | OVERLAY FLIP DELAY | BUFFER 1 FIELD 1 | BUFFER 1 FIELD 2 | BUFFER 2 FIELD 1 | BUFFER 2 FIELD 2 | OVERLAY BUFFER | OVERLAY MODE |
|---|---|---|---|---|---|---|---|---|---|---|---|
| 1 | A1 | 0 | 1 | | 0 | A1 | – | – | – | – | – |
| 2 | A2 | 0 | 1 | | 0 | A1 | A2 | – | – | – | – |
| 3 | A1 | 1 | 1 | SKIP | Half Field | A1 | A2 | – | – | A1/A2 | WEAVE |
| 4 | B2 | 0 | 1 | | 0 | A1 | A2 | B1 | – | A1/A2 | WEAVE |
| 5 | B1 | 0 | 1 | | 0 | A1 | A2 | B1 | B2 | A1/A2 | WEAVE |
| 6 | C2 | 0 | 1 | | 0 | C1 | C2 | B1 | B2 | B1/B2 | WEAVE |
| 7 | C1 | 1 | 1 | SKIP | Half Field | C1 | C2 | B1 | B2 | B1/B2 | WEAVE |
| 8 | C2 | 0 | 1 | | 0 | C1 | C2 | D1 | B2 | C1/C2 | WEAVE |
| 9 | D1 | 0 | 1 | | 0 | C1 | C2 | D1 | D2 | C1/C2 | WEAVE |
| 10 | D2 | 0 | 1 | | 0 | C1 | C2 | D1 | D2 | C1/C2 | WEAVE |
| 11 | E1 | 0 | 0 | | 0 | E1 | E2 | D1 | D2 | D1/D2 | WEAVE |
| 12 | E2 | 0 | 0 | | 0 | E1 | E2 | D1 | D2 | D1/D2 | WEAVE |
| 13 | F1 | 0 | 0 | | 0 | E1 | E2 | F1 | F2 | E1 | BOB |
| 14 | F2 | 0 | 0 | | 0 | E1 | E2 | F1 | F2 | E2 | BOB |
| ... | ... | ... | ... | ... | ... | ... | ... | ... | ... | ... | ... |

FIG. 7

APPARATUS AND METHOD FOR DISPLAY OF PROGRESSIVE AND INTERLAND VIDEO CONTENT

This application claims the benefit of prior filed provisional application titled "Method And Apparatus For Automatic Display Of Progressive And Interlaced Video Content;" provisional application No. 60/097,236; filed Aug. 20, 1998.

BACKGROUND OF THE INVENTION

1. Field of the Invention

The present invention relates generally to computer systems architecture, and, more particularly, to a method and apparatus for the display of progressive and interlaced video content on a display.

2. Background of the Related Art

It is believed that digital video disc (DVD) is the next generation of optical disc storage technology that is expected to eventually replace the audio compact disc (CD), videotape, laser disc, and CD-ROM (read only memory). Currently, DVD is available in two formats, DVD-Video, which can store video such as movies, for example, and, DVD-ROM, which can store computer programs for use with a computer.

The display of motion video on computer system displays has become increasingly popular. However, one difficulty encountered with DVD-Video on a computer system is the format conversion that the computer system needs to perform to display the DVD-Video. This mainly results because the display scanning technique used for computer monitors is different from that for standard television screens.

Referring to FIGS. 1A and 1B of the drawings, two conventional scanning techniques for displaying images on different types of displays are shown. FIG. 1A illustrates an interlaced scanning technique (also referred to as interleaved scanning), which is performed on conventional television sets in accordance with the National Television Standard Committee (NTSC) format. A conventional television screen has 525 scan lines, which make up a frame. Images appear on the television screen by scanning the odd lines of the frame first, and, subsequently, scanning the even lines of the frame. The odd and even lines of the screen each make up their own respective field. Accordingly, a frame includes two fields (i.e., an "odd" field that includes the odd lines of the frame and an "even" field that includes the even lines of the frame). In accordance with the NTSC format, 60 fields are displayed per second on a television screen, which results in a frame rate of 30 frames per second.

As opposed to interlaced scanning, some displays use a progressive scanning technique as shown in FIG. 1B. Progressive scanning requires twice the frequency as interlaced scanning to achieve the same refresh rate. Such progressive scan displays are typically more expensive than interlaced displays, and are used in most cases as a computer monitor for a computer system. In progressive scanning, the 525 lines of the display are scanned in sequential order, which enables a more superior picture quality than that of the interlaced displays.

DVD often contains both progressive and interlaced formats on a single disc. DVD/MPEG2 (Motion Picture Expert Group, standard 2) decoding outputs standard NTSC signals. The 60 fields/second interlaced television content is presented as it is in the original NTSC format. However, for 24 frames/sec. progressive film content, 60 fields/sec. interlaced NTSC signal is generated using 3:2 pulldown algorithm, such as the one defined by the MPEG specification. Each decoded frame is presented as two interlaced fields. For example, frame A is presented as A1 and A2. Some fields are duplicated according to the repeat field control signal in the MPEG2 stream. When showing DVD/MPEG2 video on a progressive computer monitor, the video display needs to be adjusted for field or frame contents, in order to decrease motion artifacts.

FIG. 2 illustrates a conventional 3:2 pulldown technique for converting a 24 frames/sec. progressive film content 205 to a 60 fields/sec. interlaced format in accordance with the NTSC format. Frames 210 of the progressive video content are converted to fields 220 of the NTSC standard. The first frame A is converted to three fields, in which the third field is the repeat of the first field. That is, frame A is decoded to A1, A2 and A1 again. The second frame has only two fields B2 and B1. The 3:2 pattern is then repeated, as shown, for the subsequent frames. For field-based content, one method can be used to present each field separately with one line offset for field 2. For frame-based content, another method is needed to remove the repeated fields to present one frame at a time. Currently field skip is achieved through software interrupt service. However, due to interrupt latency problems, the software-based method can be slow and/or unreliable.

The present invention is directed to providing a hardware system for adjusting the video capture and video overlay for the field-based and frame-based contents.

SUMMARY OF THE INVENTION

A technique for processing video data in which a decoder receives video data and decodes into fields based on content format of the video data. The decoder generates a flag associated with the content format. A memory stores the decoded fields and a controller coupled to the decoder and the memory receives the decoded fields and the flag. The controller also stores the fields in the memory and retrieves the fields from the memory in a selected format based on the flag.

BRIEF DESCRIPTION OF THE DRAWINGS

FIG. 7 shows a table for indicating the status of a series of fields from a video data stream.

DETAILED DESCRIPTION OF THE INVENTION

Figure 3:
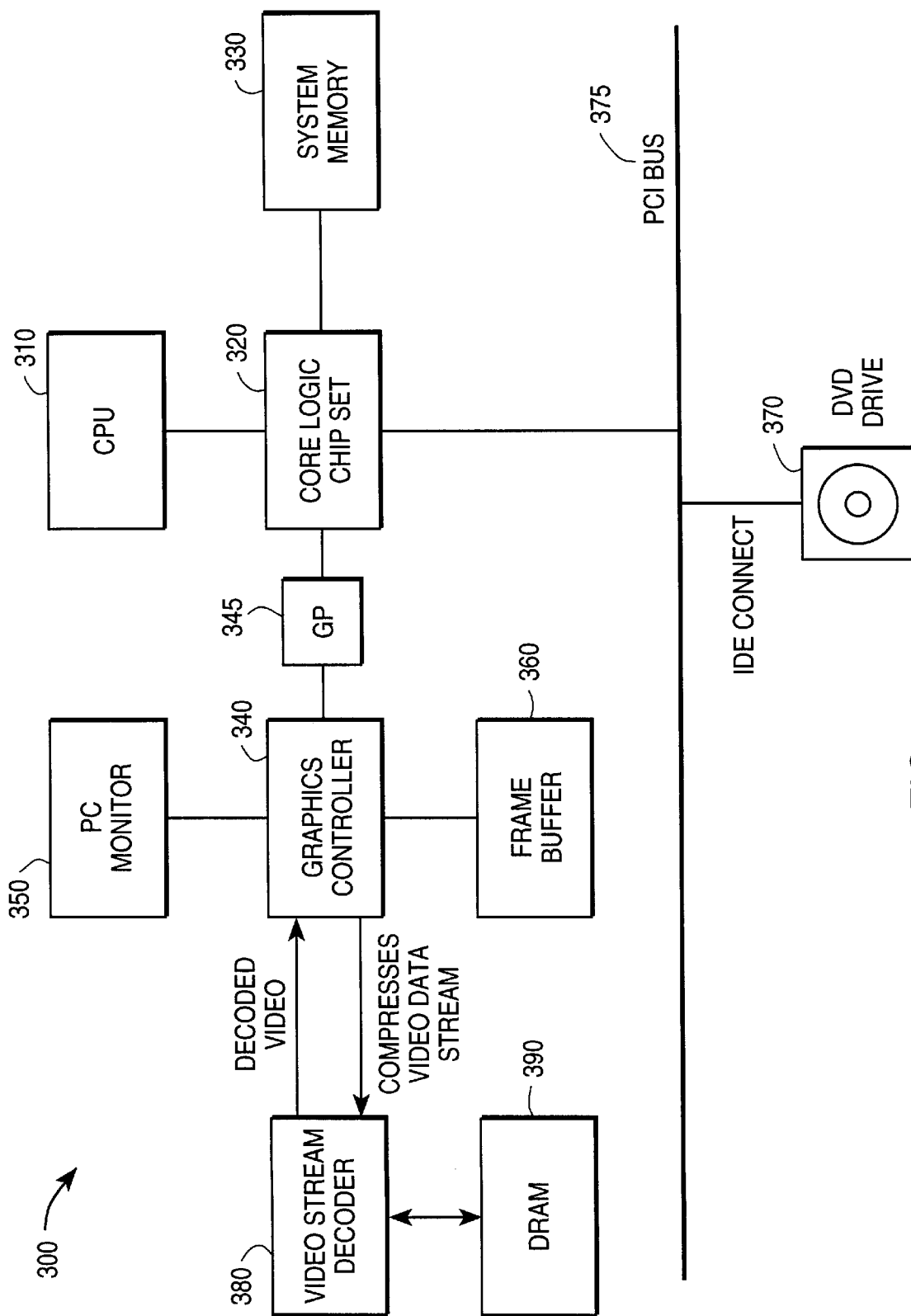
FIG. 3 shows a block diagram of a computer system in accordance with one embodiment of the present invention.

Referring to FIG. 3, a computer system 300 for the display of progressive and interlaced video content on a computer monitor is shown in accordance with one embodiment of the present invention. The system 300 (which can be a system commonly referred to as a personal computer or PC) includes a processor or central processing unit (CPU) 310 (one such processor being a Pentium® processor from Intel Corp.) for performing the processing of the computer system 300. The CPU 310 is coupled to a core logic 320, which is a chipset that controls access to a system memory 330 by the CPU 310. The core logic 320 is also coupled to a graphics controller 340 via a device referred to as a graphics port (GP) 345 (one such graphics port is a graphics port referred to in the industry as an Advanced Graphics Port, or AGP) in accordance with one embodiment. The GP device 345 provides a direct point-to-point connection between the graphics controller 340 and core logic 320.

Alternatively, the graphics controller 340 could be configured to access the core logic 320 via a peripheral component interconnect (PCI™) bus 375, if so desired. The graphics controller 340 controls the displaying of graphics and/or video images on a PC monitor 350. The monitor 350 can be either an interlaced or progressive monitor, but typically is a progressive display device. A frame buffer 360 is also coupled to the graphics controller 340 for buffering the data from the graphics controller 340, CPU 310, or other devices within the computer system 300 for display of video images on the monitor 350.

The computer system 300 is further configured with a digital video disc (DVD) drive 370, which is coupled to the core logic 320 via the PCI bus 375. The DVD drive 370 may be coupled to the PCI bus 375 via an IDE interface, as is well known in the art. The DVD drive 370 is configured to read data from any one of a number of currently available DVDs. For example, the DVD could be a DVD-Video disc, displaying a movie onto the PC monitor 350. Alternatively, the DVD could be a DVD-ROM disc having a computer program stored thereon in order to run the program on the computer system 300. Since the present invention is directed to displaying DVD-Video on the monitor 350, all references hereinafter to DVD pertain to DVD-Video.

In the described embodiment, video and audio data from the DVD is typically obtained in compressed format. The DVD will typically store both progressive and interlaced video content in a compressed format in accordance with a standard, such as the MPEG-2 standard. A complete description of the MPEG-2 standard can be found in "Information Technology—Generic Coding of Moving Pictures and Associated Audio Information: Video;" published by the International Organization for Standardization (ISO) and the International Electrotechnical Commission (IEC); ISO-IEC 13818-2; May 15, 1996. However, it is noted that the present invention can be readily adapted for other formats as well and need not be limited to MPEG-2.

A video stream decoder 380 is coupled to the graphics controller 340 and receives the compressed video data stream from the DVD drive 370. The video stream decoder 380 buffers the compressed video data stream in a dynamic random access memory (DRAM) 390, which is coupled to the video stream decoder 380. Although a DRAM is preferred for the speed, other storage devices could be utilized for the memory 390. The video stream decoder 380 then retrieves the video data from the memory 390 as needed and decompresses and decodes the video data. The decoded video data is output to the graphics controller 340 for processing and eventual display on the monitor 350.

Figure 4:
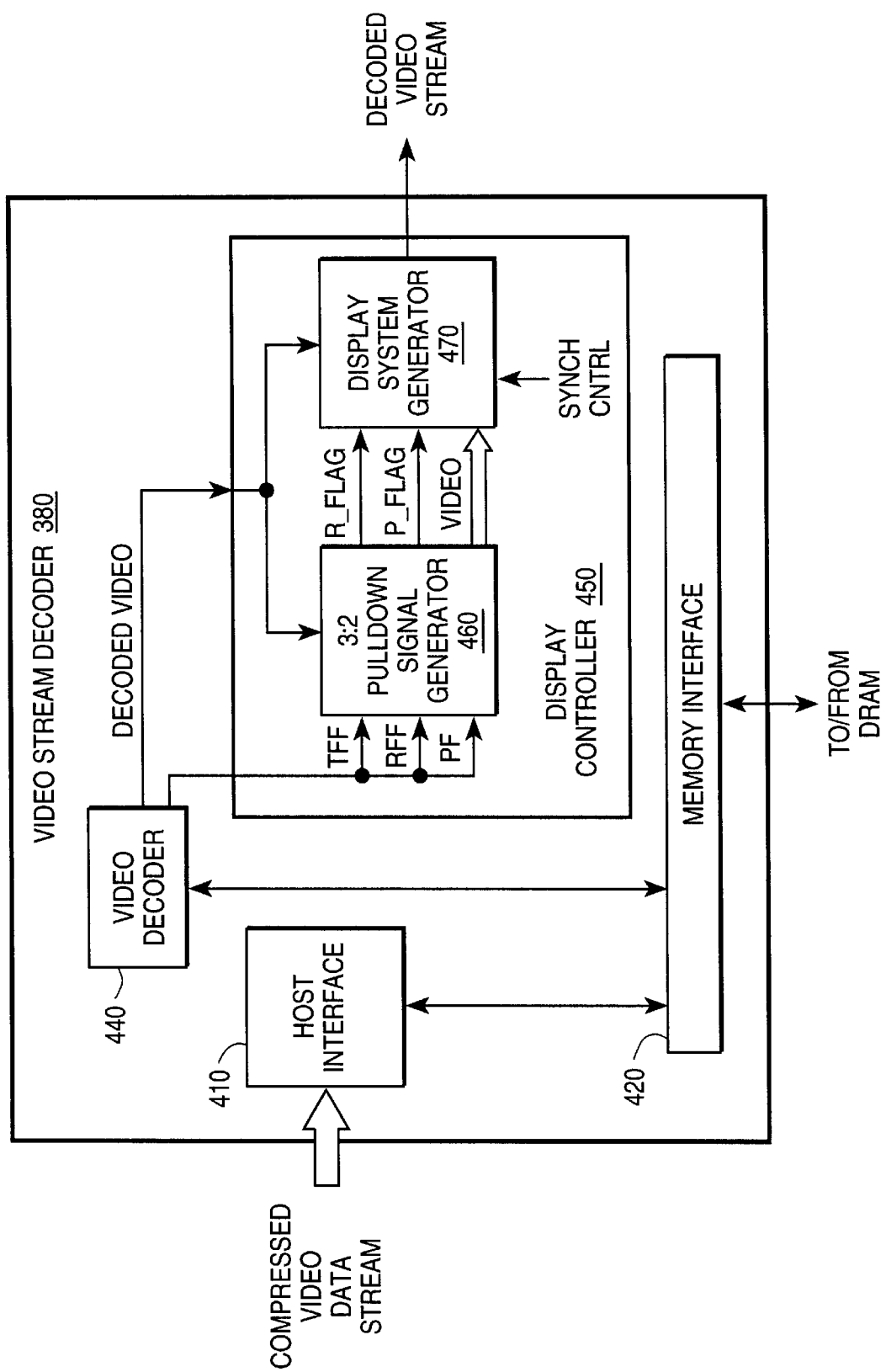
FIG. 4 depicts a block diagram providing details of a video stream decoder of FIG. 3.

Referring to FIG. 4, a block diagram of the video stream decoder 380 is shown. The video stream decoder 380 includes a host interface 410 for providing an interface to the graphics controller 340 for receipt of the compressed video data. The video stream decoder 380 receives the compressed video data stream from the DVD drive 170 via the graphics controller 340. The host interface 410 couples to a memory interface 420, which couples to the memory 390. When the compressed video data stream enters the video stream decoder 380, the host interface 410 stores (buffers) the compressed video data stream in the memory 390 via the memory interface 420. Later, a video decoder 440 reads (retrieves) the video data from the memory 390 and decodes the video portion of the data.

Figure 1:
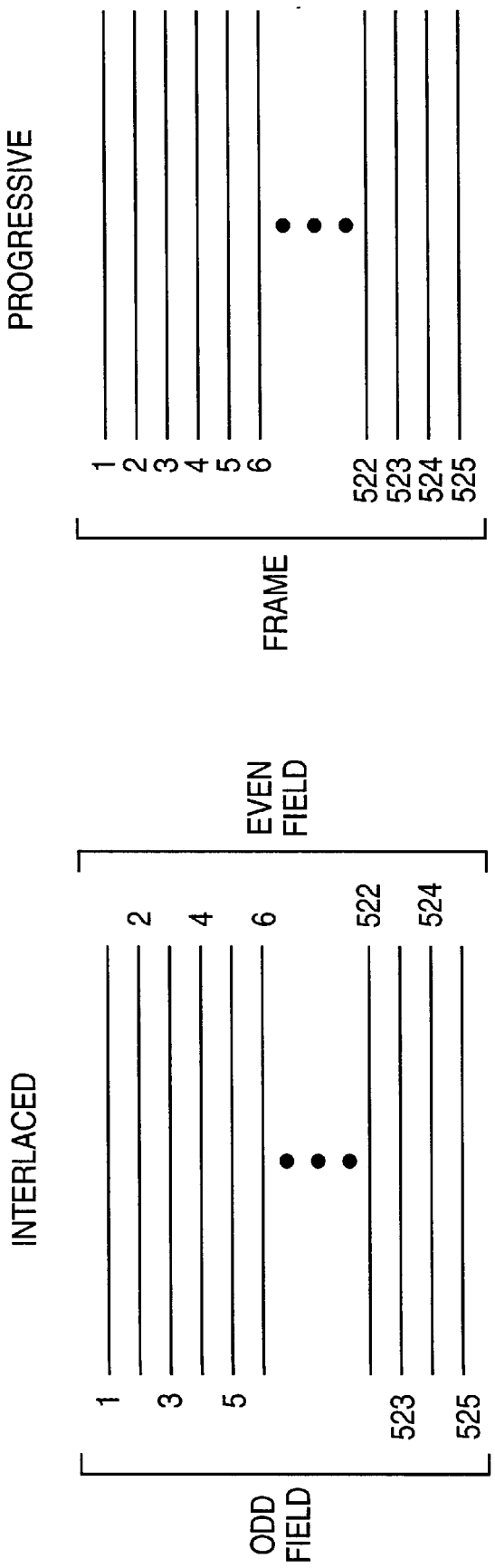
FIG. 1A illustrates a conventional interlaced scanning for displaying images on a display screen.
FIG. 1B illustrates a conventional progressive scanning for displaying images on a display screen.
Figure 2:
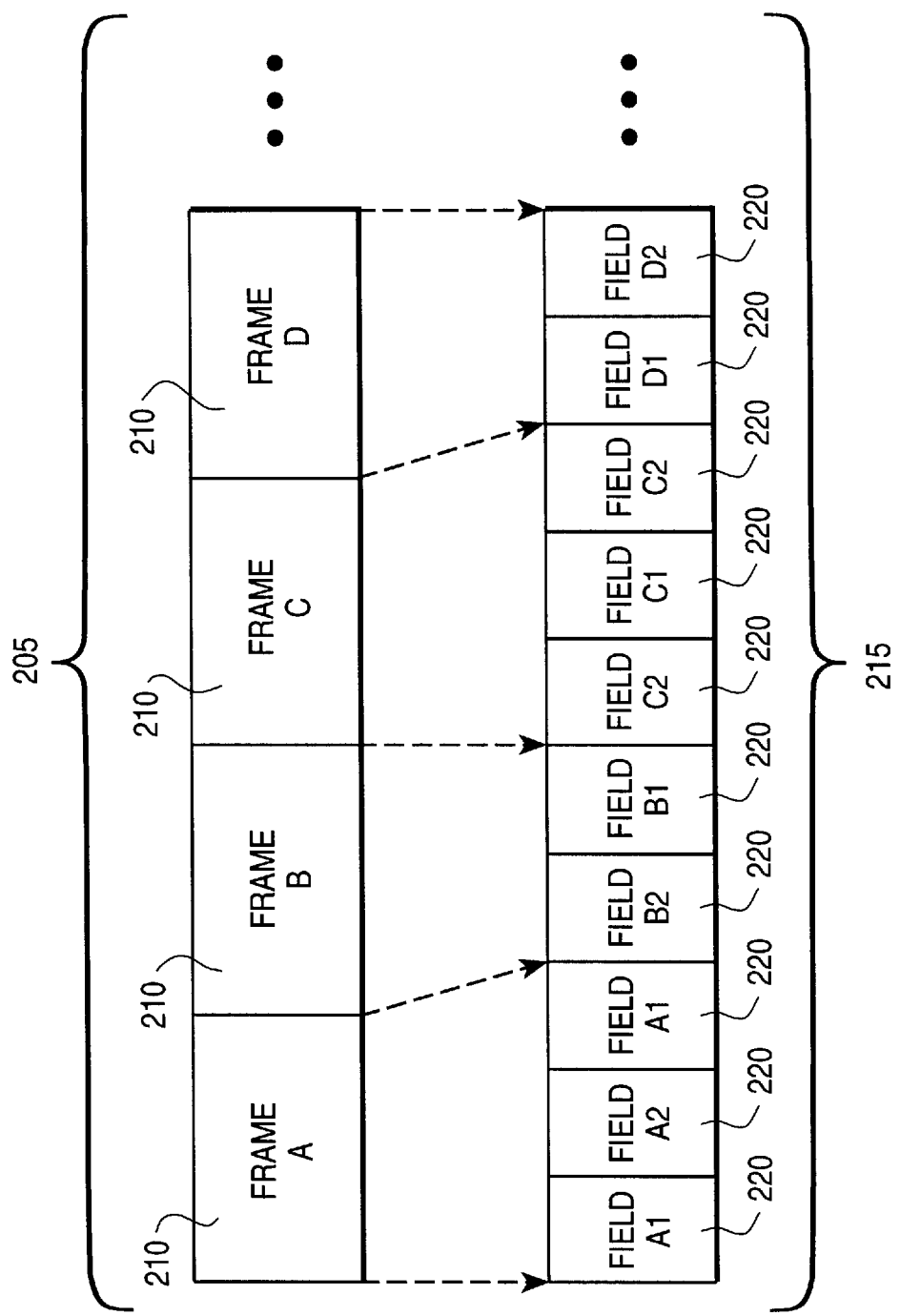
FIG. 2 shows a conventional process for a 3:2 pulldown conversion technique to convert form a progressive video content to an interlaced video content.

The video decoder 440 couples the decoded data to a display controller 450, which performs the 3:2 pulldown conversion on the progressive frames of the decoded video data stream in a manner well known and described in reference to FIG. 2. As previously mentioned, the DVD typically has stored thereon portions of video data that are in a progressive format and portions of video data in an interlaced format. The display controller 450 performs a conversation (i.e., using the 3:2 pulldown technique) on the portions of the video data that are in the progressive format to the interlaced format. Accordingly, after the display controller 450 performs such 3:2 pulldown technique, the decoded video data will be in the interlaced format (i.e., the decoded video will be "field-based"). The display controller 450 retrieves the video data that is to be converted using the 3:2 pulldown technique from the DRAM 390 via the memory interface 420.

In the described embodiment of the present invention, the display controller 450 is provided with a 3:2 pulldown signal generator 460 for generating a repeated_field_flag (R_flag) and a progressive_field_flag (P_flag). The signal generator 460 also receives decoded parameters that are included in the MPEG-2 video data stream from the DVD. These binary parameters include a top_field_first (TFF) parameter, which is used to indicate which field of a frame is first in the data stream; a repeat_first_field (RFF) parameter, which indicates whether or not a frame is to have a repeated first field; and a progressive frame (PF) parameter, which indicates the frames of the data stream that are in the progressive format. As mentioned, these parameters TFF, RFF, and PF are included in the compressed MPEG-2 video stream from the DVD. The parameters are decoded and extracted from the video stream by the video decoder 440, and are passed from the video decoder 440 to the display controller 450 for input to the 3:2 pulldown signal generator 460.

The 3:2 pulldown signal generator 460 generates the R_fag and the P_flag for each field of the decoded video data from the parameters TFF, RFF, and PF. Specifically, the R_flag is derived from the parameters TFF and RFF. When the display controller 450 performs a 3:2 pulldown operation and a repeated field is generated, the R_flag is set to "1". Conversely, if a field is not repeated in the 3:2 pulldown conversion, R_flag is set to "0" for that particular field. The P_flag is derived from the parameter PF (i.e., progressive frame parameter) from the decoded MPEG-2 video stream. If a particular field is part of a progressive frame, P_flag is set to "1" for that particular field, and if the field is not part of a progressive frame, P_flag is set to "0" for that particular frame.

The status of the P_flag and R_flag signals generated by the signal generator 460 for each field of the decoded video stream are then passed to a display stream generator 470, which encodes the state of the P_flag and R_flag in each field of the decoded video stream. The display stream generator 470 also receives synchronization control information from a synchronization control generator (not shown). The synchronization control generator could be resident on the video stream decoder chip 380 itself or, alternatively, on another device within the computer system 300. The display system generator 470 receives the decoded video data for inclusion in the decoded video stream.

Figure 5:
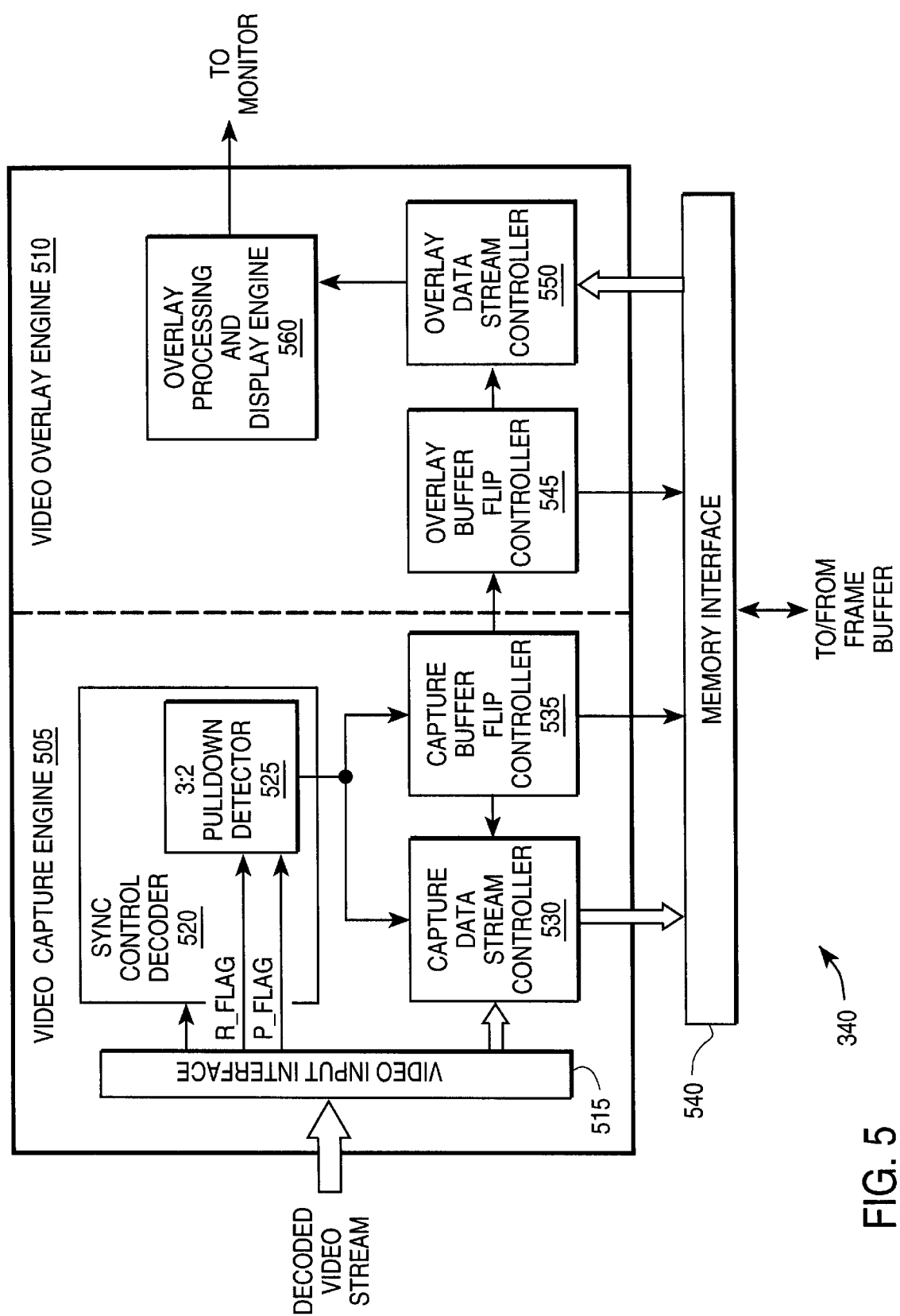
FIG. 5 shows a block diagram providing details for a graphics controller of FIG. 3.

The decoded video stream, with R_flag and P_flag signals encoded thereon for each field of the stream, is then sent from the display generator 470 to the graphics controller 340, which is shown in detail in FIG. 5. FIG. 5 shows only that portion of the controller 340 for processing the decoded video. The graphics controller 340 includes a video capture engine 505 for processing the decoded video stream from the video stream decoder 380 and sends the decoded video stream into the frame buffer 360. The video capture engine 505 also provides synchronization with a video overlay engine 510 for displaying the decoded video on the monitor 350. The video capture engine 505 includes a video input interface 515 for receiving the decoded video stream from the video stream decoder 380.

A synchronization control decoder 520 is coupled to the video input interface 515. The synchronization control decoder 520 receives the decoded video stream and detects and decodes the synchronization control signals that were embedded in the video data stream by the display system generator 470 in the video stream decoder 380. The synchronization control signals, for example, are used for horizontal and vertical synchronization of the video for the separation of odd and even fields, as well as for other functions, which are well known to those skilled in the art.

The synchronization control detector 520 includes a 3:2 pulldown detector 525, which detects the R_flag and P_flag signals for each field of the decoded video stream. The synchronization control detector 520 detects the decoded R_flag and P_flag signals and the synchronization control information and outputs to a capture data stream controller 530 and to a capture buffer flip controller 535 within the video capture engine 505.

The capture data stream controller 530 sends video data from the decoded video stream for storage in a buffer memory (shown as the frame buffer 360), via a memory interface 540. The manner in how the decoded video is stored within the buffer 360 is described below. Subsequently, an overlay data stream controller 550 of the video overlay engine 510 retrieves the video data from the frame buffer 360 and sends the video data to an overlay processing and display engine 560 for displaying the video on the monitor 350.

Figure 6:
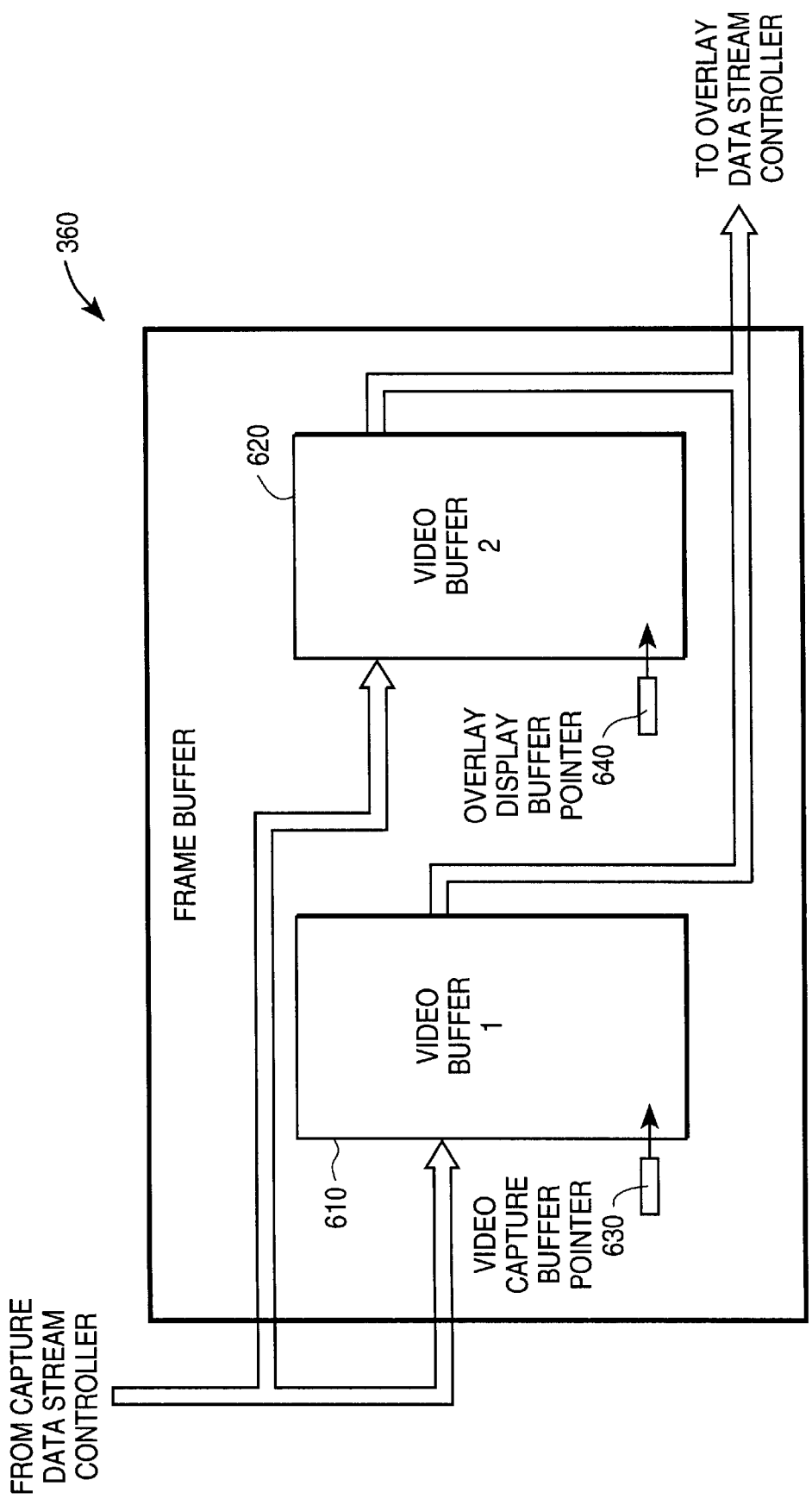
FIG. 6 illustrates a detailed block diagram of a frame buffer of FIG. 3.

Referring to FIG. 6, a detailed diagram of the frame buffer 360 is shown. The frame buffer 360 includes a first video buffer section 610 and a second video buffer section 620, in accordance with one embodiment. The buffer sections 610, 620 are for storing the decoded video data from the capture data stream controller 530 and loading the data to the overlay data stream controller 550. It will be appreciated that the frame buffer 360 could include more than two buffers, and thus, need not necessarily be limited to the two video buffers 610, 620 shown. In the particular embodiment, each video buffer 610, 620 stores two fields of video data for eventual display on the display 350. Again, as an alternative embodiment, each video buffer 610, 620 can store only one field or store one and two fields depending on the operation.

The capture buffer flip controller 535 indicates which video buffer 610, 620 to store the video data from the capture data stream controller 530. As the video data is stored in one of the video buffers 610, 620 by the capture data stream controller 530, the overlay data stream controller 550 extracts the video data from the other video buffer for displaying the video data on the monitor 350 via the overlay processing and display engine 560.

The capture buffer flip controller 535 further provides a signal to an overlay buffer flip controller 545, which coordinates an "auto-flip" or switch process between the video buffers 610, 620. For example, the capture data stream controller 530 will initially store video data in the first video buffer 610 while the overlay data stream controller 550 will retrieve video data from the video buffer 620 to display such video on the monitor 350. The capture data stream controller 530 and the overlay data stream controller 550 will then receive updated pointer information for video capture and overlay display pointers 630, 640 from their respective flip controllers 535 and 545, such that the capture data stream controller 530 will store video data in the video buffer 620 and the overlay data stream controller 550 will extract the video data from video buffer 610 (which was previously stored by the capture data stream controller 530) for display on the monitor 350.

Accordingly, the capture and overlay data stream controllers 530, 550 will switch or swap the video buffers 610, 620. As the capture data stream controller 530 stores data to one buffer, the overlay data stream controller 550 will load data from the other buffer. The video capture buffer pointer 630 is used to address the location in the buffer for storing the data, while an overlay display buffer pointer 640 is used to address the location where data is to be retrieved.

Referring to FIG. 7, a table 700 illustrates the hardware response to the video content switch from frame-based content to field-based content. For each one of the fields in the decoded video stream (whether it be frame-based content or field-based content), table 700 illustrates the operations performed for eventual display of the video data on the monitor 350. The field number 705 of table 700 includes the field position of each field of a frame-based or field-based content received and the input video data for the field 705 is defined in column 710. Referring back to FIG. 2, the first field 220 of the stream has input video data of A1, the second field of the stream has input video data A2, and so on. The table 700 further lists the R_flag and P_flag (shown in column 715 and 720) for each respective field 710 in the stream.

In the example provided for in FIG. 2, the repeated fields correspond to the third and eighth fields 220 of the video data stream, where the third field having a video data content A1 is a repeated field of the first field also having the video content A1. Likewise, the eighth field having a video content C2 is a repeated field of the sixth field of the stream, which also has a video content of C2. For these repeated fields 220, the R_flag is set to "1". The P_flag 720 indicates whether or not a particular field 220 is of a progressive content. In the example provided, the first ten fields of the stream are in progressive format. Since these ten fields are in progressive format, the repeated fields (i.e., the third and eighth fields of the stream) can be skipped as noted in column 725. That is, the third and eighth fields of the stream are dropped because they are a repeated field and are not needed when video content of that particular portion of the stream is progressive. Accordingly, an AND logic operation of the R_flag and the P_flag signals will determine if the particular field is to be skipped. When skipped, the overlay flip delay 728 is set to be a "half field delay" in order to generate uniform frame display timing for the progressive frames. For other fields that are not repeated, the overlay flip delay is set to zero.

The table 700 also shows how the data is stored in the two buffers 610, 620 in column 730 and 735. For example, when the first field A1 is received, A1 is stored in Field Entry 1 of Buffer 1. When the second field A2 is received, it is stored in Field Entry 2 of Buffer 1, so that A1 and A2 are stored in the two corresponding Field Entries. When the third field, which is the repeat of A1, is received, this field is skipped (as noted in column 725). When the B2 and B1 data are received, it is placed into the two Field Entries of Buffer 2. The example of FIG. 7 shows the first 10 video entries as having frame-based content and the last four as having field-based content. The value of the P_flag determines if the data content is frame-based or field-based. The R_flag value determines if the data is the original or a repeat field for the frame-based content, which will then be skipped.

It is appreciated that an alternative to skipping the repeat field is available. Instead of skipping the repeat field, the repeat field can be first written and then the next data can be written over the repeat field. Either technique results in the removal of the repeat field. Accordingly, where the description describes the skipping feature, the overwrite technique can be implemented instead.

Thus, the capture data stream controller 530 stores the video content from the video stream into the video buffers 610 and 620 based on the R_flag and P_flag signals. The overlay data stream controller 550 then retrieves the video content from the video buffers 610 and 620 as shown in table 700 and sends the video content to the overlay processing and display engine 560. The manner in which the data is retrieved is determined by the P_flag signal in accordance with a particular display mode technique, referred to as a "bob" and "weave" modes or methods for display on the monitor 350.

The "bob" and "weave" methods are used to adjust the video data for the progressive and interlaced contents of the video stream such that the video data is properly displayed on the monitor 350. The "bob" method is used for displaying the video content having the interlaced format, while the "weave" method is used for displaying the video content having the progressive format. A number of techniques can be implemented to perform the "bob" and "weave" methods for displaying progressive and interlaced video contents.

One technique of implementing the table 700 of FIG. 7 is by utilizing a number of signals and a counter. The R_flag and the P_flag signals have been discussed above. A buffer_select signal is utilized to select the buffer 610, 620 for writing the data. The pointers 630 and 640 point to the particular address for storing or loading the data and are flipped as the buffers are switched from the capture mode to the overlay mode. When one buffer is selected for receiving the video data from the capture data stream controller 530, the other is utilized to retrieve the data into the overlay stream controller 550.

The "weave" and "bob" modes are determined by the use of a BobWeave_flag, which is derived from the R_flag and P_flag values. When the P_flag has a value of "1", it signifies the weave mode. When an P_flag has a value of "0", it signifies the bob mode. In the particular embodiment, when the P_flag and R_flag both have a value of "1", the weave mode is initiated and remains in the weave mode for 5 entries. A counter is used for the counting up the five entries and then resetting. At the end of the five-count, the overlay data stream controller 550 reverts to the "bob" mode, unless another repeat entry (R_and P_flag values of "1") is detected. As shown in column 740, the mode determines how the data is to be presented on the display.

Figure 8:
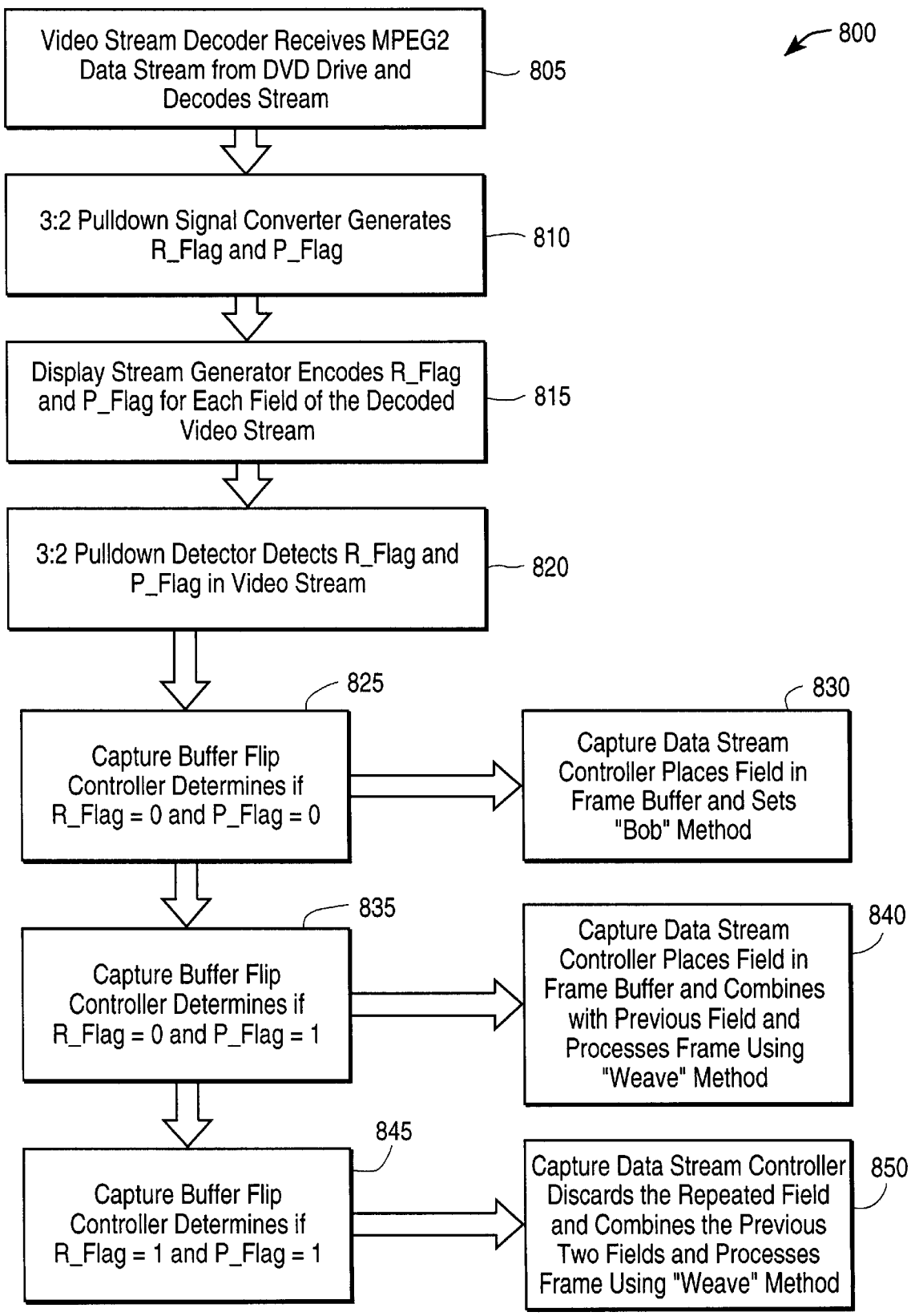
FIG. 8 illustrates an operational technique of the invention for the display of progressive and interlaced video content on a computer monitor in accordance with one embodiment of the present invention.

Referring to FIG. 8, an operational flow diagram 800 for hardware control of the display of progressive and interlaced video content on the monitor 350 is shown, as it pertains to the embodiment of the invention described above. The flow diagram 800 commences at block 805, where the video stream decoder 380 receives the MPEG-2 compressed video data stream from a DVD in the DVD drive 370 and decodes the data stream. At block 810, the 3:2 pulldown signal converter 460 generates the R_flag and the P_flag for each field of the decoded video data stream that was generated by the display stream generator 470. The display stream generator 470 then encodes the R_flag and P_flag signals in each field of the decoded video data stream at block 815. The graphics controller 340, at block 820, receives the decoded video data stream with the encoded R_flag and P_flag signals, and detects these flags in the 3:2 pulldown detector 525.

At block 825, the capture data stream controller 530 determines if the P_flag is set to "0" and if the R_flag is set to "0". This would indicate that the field is not in a progressive format (i.e., that it is interlaced) and that the field is not a repeated field. If the P_flag and R_flag are both set to "0", the graphic controller 340 proceeds to block 830. At block 830, the capture data stream controller 530 places that particular field in the frame buffer 360, and the overlay processing and display engine 560 sets forth the "bob" method for displaying that particular field on the monitor 350.

If, however, P_flag and R_flag are not set equal to "0", the controller 340 continues to block 835, where the capture data buffer flip controller 545 determines if P_flag is set to "1" and R_fag is set to "0". In this case, the field has a progressive video content and the field is not a repeated field. If P_flag and R_flag are set to "1" and "0", respectively, then the controller 340 proceeds to block 840. At block 840, the capture data stream controller 530 stores the field in the video buffer 610, 620 within the frame buffer 360, combines this field with another field in the stream (which is the corresponding Entry in the buffer storage) and then processes the combined as a newly created frame with the "weave" method for display on the monitor 350. That is, in the "bob" mode, each Buffer Field Entry stored is retrieved separately, but processed according to the content.

If, however, in block 835 P_flag and R_flag are not set to "1" and "0", respectively, the controller 340 proceeds to block 845. At block 845, the capture buffer flip controller 530 determines if P_flag and R_flag are both set to "1". In this case, the field is in the progressive format and is also a repeated field. If P_flag and R_flag are set to "1", then the controller 340 proceeds to step 850, where the capture data stream controller 530 drops the repeated field. The repeated field in this progressive frame is a duplicate of the first field of the frame, and thus, is not needed for the progressive format. Accordingly, the first field is already present within the video buffer 610, 620 of the frame buffer 360, and will display the progressive frame just containing the first and second field on the monitor 350.

Again, a variety of techniques can be implemented to provide the operation described above. One technique is the use of hardware flags and a counter, which is also described above.

Furthermore, the overlay buffer flip controller 545 applies proper delay to maintain correct flip timing for progressive video sequences and interlaced video sequences. For a 60 field per second interlaced content, the overlay display flip should occur at each field boundary. Specifically, as shown in FIG. 7, when interlaced video fields are stored in interleaved format in the video buffer 610, 620, the overlay buffer flip controller 545 issues Flip Even Field and Flip Odd Field commands to the same video buffer 610, 620 twice. When the video content switches to 24 frames per second progressive data, the repeated fields are skipped or removed. In the meantime, an overlay display flip trigger time can be adjusted so that the presentation of the 24 frames per second progressive content is uniform. Specifically, the 24 frames per second progressive frames can be flipped at a uniform order. This is accomplished by using a "half-field" overlay flip delay to adjust the flip command at the half way point of the skipped field. This is shown in the half-field overlay flip delay column 728 as shown in column 728 of FIG. 7. This is also shown in the plot of FIG. 9.

Figure 9:
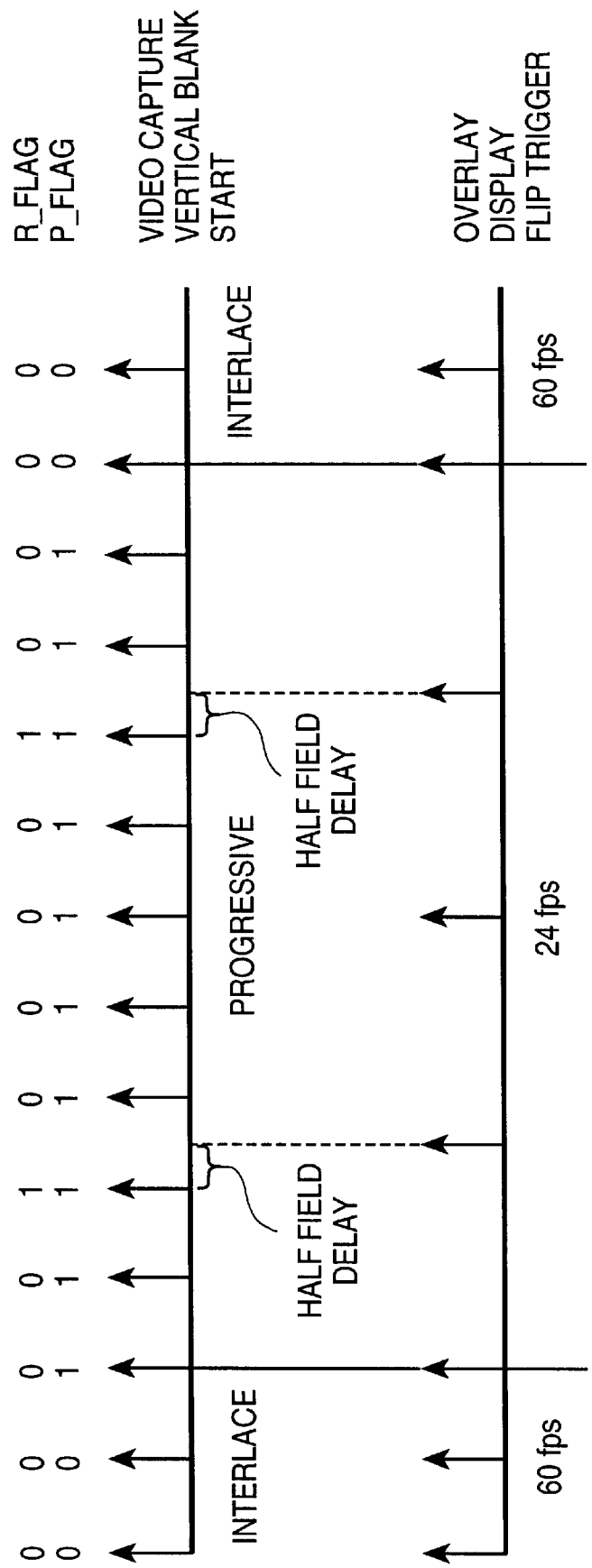
FIG. 9 illustrates a timing sequence for an overlay buffer flip controller of FIG. 5.

The lower plot of FIG. 9 shows the flip trigger order. The actual trigger position may depend on the video display delay from the video capture engine 505 to the overlay display engine 510. The plots show that by moving the overlay flip triggers from the aligned field position to half way of the "repeated" fields, the progressive contents are displayed at a uniform order of 24 frames per second.

The particular embodiments disclosed above are illustrative only, as the invention may be modified and practiced in different but equivalent manners apparent to those skilled in the art having the benefit of the teachings herein. Furthermore, no limitations are intended to the details of construction for design herein shown, other than as described in the claims below. It is therefore evident that the particular embodiments disclosed above may be altered or modified and all such variations are considered within the spirit and scope of the invention.

It is also to be noted that the described compressed video data stream is in the MPEG-2 format from a DVD device. However, the invention can be adapted for other formats. Furthermore, the data could come from other sources, such as for example, a digital satellite system (DSS) tuner or other known MPEG format devices. Such devices may be used either in addition to or in lieu of the DVD drive 370 to provide the compressed video data stream to the video stream decoder 380. Also, the present invention need not be limited to the computer system 300 as shown in FIG. 3, but can be adapted to other video processing devices and systems.

Thus, a technique for display of progressive and interlaced video content is described. It is noted that the present invention allows for hardware detection of the progressive and interlaced content and the removal of the repeat field when present. The detection also allows for invoking the correct mode for displaying the video on a monitor.

I claim:

1. An apparatus comprising:
    a decoder to receive video data and to decode the video data into fields based on content format of the video data, said decoder to receive a first flag to indicate the content format as one of progressive video and interlaced video and a second flag to indicate if a particular field is a repeating field;
    a memory to store the decoded fields therein, wherein the particular field is to be stored in the memory, but subsequently overwritten, if the first flag indicates that the video data is progressive and the second flag indicates that the particular field is the repeating field; and
    a controller coupled to said decoder and said memory to receive the decoded fields and the first and second flags, to store the fields in the memory and to retrieve the fields from the memory in a selected format based on the first and second flags.

2. The apparatus of claim 1 wherein the repeating field is to be skipped and not stored in the memory if the first flag indicates that the video data is progressive and the second flag indicates that the particular field is the repeating field.

3. The apparatus of claim 1 wherein the memory includes two buffer sections to alternately store the fields and provide the fields for retrieval for display.

4. A graphics controller comprising:
    a video capture engine to receive a decoded video stream, including a first flag to indicate a content format of video data present in the video stream and a second flag to indicate if a particular field is a repeating field, and to separate the video data into fields based on the content format, said video capture engine coupled to a memory to control the manner in which the fields are stored in the memory based on the first flag; and
    a video overlay engine coupled to said video capture engine to retrieve the stored fields from the memory and to display the fields as video on a display device in a selected format based on the first flag, wherein the content format is selected from a list comprising progressive video and interlaced video, and the repeating field is to be stored in the memory, but subsequently overwritten, if the first flag indicates that the video data is progressive and the second flag indicates that the decoded field is the repeating field.

5. The graphics controller of claim 4 wherein the repeating field is to be not stored in the memory if the first flag indicates that the video data is progressive and the second flag indicates that the field is the repeating field.

6. The graphics controller of claim 4 wherein the memory includes two buffer sections to alternately store the fields and provide the fields for retrieval for display.

7. The graphics controller of claim 6 wherein the graphics controller is further to generate a third flag to control switching the buffer sections.

8. A computer system comprising:
    a decoder to receive video data and to decode the video data into fields based on content format of the video data, said decoder to receive a first flag associated with the content format and a second flag to indicate if a particular field is a repeating field;
    a buffer memory to store the decoded fields therein; and
    a graphics controller coupled to said decoder and said buffer memory to receive the decoded fields and the first flag, to store the fields in the buffer memory in a selected format based on the first flag and to retrieve the fields from the buffer memory in the selected format, wherein the content format is selected from progressive video and interlaced video, and the repeating field is to be stored in the memory, but subsequently overwritten, if the first flag indicates that the video data is progressive and the second flag indicates that the decoded field is the repeating field.

9. The computer system of claim 8 wherein the repeating field of a frame is to be not stored in the buffer memory if the first flag indicates that the video data is progressive and the second flag indicates that the decoded field is the repeating field.

10. The computer system of claim 8 wherein the buffer memory includes two buffer sections to alternately store the fields and provide the fields for retrieval for display.

11. The computer system of claim 10 wherein said controller is further to generate a third flag as a control signal to switch the buffer sections.

12. The computer system of claim 8 wherein said graphics controller is to introduce a half field delay when the repeating field is encountered.

13. A method comprising:

receiving video data;

decoding the received video data into fields;

determining if the received data is of progressive or interlaced video content;

generating a first hardware flag indicative of said video content;

generating a second hardware flag when a field is repeated;

storing the fields in memory in a format indicated by the first and second hardware flags;

utilizing the first and second hardware flags to process the fields for a mode of display without displaying the repeated field;

using the first hardware flag to indicate if the video content is progressive or interlaced; and using the second hardware flag to indicate that the field is the repeating field, and either not storing the field in the memory or overwriting the repeating field, if the two hardware flags indicate that the field is repeated and the content is progressive.

14. The method of claim 13, further comprising switching between two buffer section in memory for each frame of video.

15. The method of claim 13, wherein said receiving video data includes receiving data from a digital video disk.

* * * * *

UNITED STATES PATENT AND TRADEMARK OFFICE
CERTIFICATE OF CORRECTION

PATENT NO. : 6,670,996 B2
DATED : December 30, 2003
INVENTOR(S) : Jiang

It is certified that error appears in the above-identified patent and that said Letters Patent is hereby corrected as shown below:

Title page,
Item [54], Title, delete "INTERLAND", insert -- INTERLACED --.

Column 7,
Line 58, before "stream", insert -- data --.

Column 8,
Line 2, delete "R_", insert -- R_flag --.

Signed and Sealed this

Twentieth Day of April, 2004

JON W. DUDAS
*Acting Director of the United States Patent and Trademark Office*